US008428023B2

(12) United States Patent
Bekiares et al.

(10) Patent No.: US 8,428,023 B2
(45) Date of Patent: Apr. 23, 2013

(54) METHOD AND APPARATUS FOR DISTRIBUTING VIDEO PACKETS OVER MULTIPLE BEARERS FOR PROVIDING UNEQUAL PACKET LOSS PROTECTION

(75) Inventors: Tyrone D. Bekiares, Chicago, IL (US); Trent J. Miller, West Chicago, IL (US); Steven D. Tine, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 250 days.

(21) Appl. No.: 12/910,137

(22) Filed: Oct. 22, 2010

(65) Prior Publication Data

US 2012/0099416 A1 Apr. 26, 2012

(51) Int. Cl.
*H04W 4/00* (2009.01)
*H04W 72/00* (2009.01)
*H04J 3/00* (2006.01)

(52) U.S. Cl.
USPC ........... 370/329; 370/336; 455/450; 455/451; 455/464

(58) Field of Classification Search ................... None
See application file for complete search history.

(56) References Cited

U.S. PATENT DOCUMENTS

| 2002/0116715 | A1 | 8/2002 | Apostolopoulos |
| 2002/0157058 | A1 | 10/2002 | Ariel et al. |
| 2004/0105589 | A1* | 6/2004 | Kawaharada et al. ........ 382/236 |
| 2006/0018379 | A1* | 1/2006 | Cooper .................... 375/240.12 |
| 2008/0069242 | A1 | 3/2008 | Xu et al. |
| 2008/0123660 | A1* | 5/2008 | Sammour et al. ........ 370/395.21 |
| 2009/0077254 | A1 | 3/2009 | Darcie et al. |
| 2010/0322069 | A1* | 12/2010 | Song et al. .................... 370/229 |
| 2012/0099564 | A1 | 4/2012 | Bekiares et al. |

FOREIGN PATENT DOCUMENTS

| EP | 2234342 A1 | 9/2010 |
| WO | 2008021182 A2 | 2/2008 |
| WO | 2010068600 A2 | 6/2010 |
| WO | WO 2010068600 A2 * | 6/2010 |

OTHER PUBLICATIONS

Ali Yaver, et al. "Utilization of Multi-Radio Access Networks for Video Streaming Services", Wireless Communications and Networking Conference, 2009, WCHC 2009, IEEE, Piscataway, NJ; Apr. 5, 2009, p. 1-6; XP031454512; ISBN:978-1-4244-2947-9, Sections 1, 11 and 111.

(Continued)

*Primary Examiner* — Daniell L Negron
*Assistant Examiner* — Albert Shih
(74) *Attorney, Agent, or Firm* — Valerie M. Davis; Kenneth A. Haas

(57) ABSTRACT

A method and apparatus distributes video packets over multiple bearers for providing unequal packet loss protection. The method includes receiving a plurality of packets that collectively includes video data from a group of pictures comprising a sequence of video frames, wherein the sequence includes one Intra frame at the beginning of the group of pictures followed by a plurality of Predictive frames. For each packet, the packet processing function: determines the corresponding frame that includes the video data; applies a bearer selection process to select one of multiple bearers for transporting the packet over an access network, wherein each bearer has a different quality of service level which influences the probability of the transported packets being dropped, wherein the bearer selection process is based on the position of the frame within the sequence of frames; and provides, to an access network entity, an indication of the selected bearer.

14 Claims, 2 Drawing Sheets

OTHER PUBLICATIONS

PCT International Search Report PCT/US2011/054204 Dated Feb. 7, 2012 for U.S. Appl. No. 12/910,742.

Lu Jianhua, et al. "Robust Video Transmission Over Correlated Mobile Fading Channels", IEEE Transactions on Circuits and Systems for Video Technology, IEEE Service Center, Piscataway, NJ, Vol. 9, No. 5, Aug. 1, 1999; XP011014594; ISSN:1051-8215.

PCT International Search Report PCT/US2011/054209 Dated Feb. 7, 2012 for Counterpart Application.

"Optimization of Video Streaming Over 3G Networks"; Dissertation, Mar. 25, 2010; Section 5.2.2, p. 89-90.

Bergeron, et al., "Modelling H.264/AVC Sensitivity for Error Protection in Wireless Transmissions"; 0-7803-9752; May 2006, IEEE; 4 Pages.

Postel, J., "Darpa Internet Program Protocol Specification," RFC 791, Sep. 1981, 49 pages.

Deering, S., et al., "Internet Protocol, Version 6 (IPv6) Specification," Network Working Group, RFC 2460, Dec. 1998, 40 pages.

Postel, J., "User Datagram Protocol," RFC 768, Aug. 28, 1980, 4 pages.

Schulzrinne, H., "RTP: A Transport Protocol for Real-Time Applications," Network Working Group, RFC 3550, Jul. 2003, 89 pages.

Non Final Office Action mailed Dec. 4, 2012 in related U.S. Appl. No. 12/910,742, Tyrone D. Bekiars, filed Oct. 22, 2010.

* cited by examiner

METHOD AND APPARATUS FOR DISTRIBUTING VIDEO PACKETS OVER MULTIPLE BEARERS FOR PROVIDING UNEQUAL PACKET LOSS PROTECTION

REFERENCE TO RELATED APPLICATIONS

The present application is related to the following U.S. applications commonly owned together with this application by Motorola, Inc.:

Ser. No. 12/910742 filed Oct. 22, 2010, titled "Method and Apparatus for Distributing Video Packets over Multiple Bearers for Providing Unequal Packet Loss Protection" by Bekiares, et al.

TECHNICAL FIELD

The technical field relates generally to transmission of video media over wireless networks and more particularly to the distribution of video packets over multiple bearers to provide unequal packet loss protection for these packets while being transported over a wireless network.

BACKGROUND

Use of streaming media technology (e.g. video over Internet Protocol (IP) and voice over IP) is growing across all market segments, inclusive of consumer, enterprise, and public safety. Today, such media is commonly transported over wired or fixed wireless networks. However, advances in wireless broadband technology are enabling such media to also be streamed over next generation wireless broadband networks.

Wireless networks are generally bandwidth limited with respect to the demand for use of these networks. Contention for wireless resources, coupled with the physics of mobile wireless (e.g. signal strength, fading) typically cause great fluctuations in available bandwidth between any two devices communicating over the network. When bandwidth demands of an application within a source device exceed instantaneous bandwidth available on the network, packet loss occurs.

This is an important consideration, as the packet loss pattern inflicted on streaming media, such as video, has ramifications on the quality of the media when it is reproduced at a destination device. Modern video codecs employ two basic techniques for encoding source video, spatial image compression and temporal motion compensation. In either case, the source video is first divided into a sequence of frames each having a mesh of macroblocks. When all of the macroblocks within a frame are encoded using spatial image compression techniques, the frame is called an Intra or "I" frame, wherein the decoding of the frame does not depend upon the successful decoding of one or more previous frames. When some or all of the macroblocks within a frame are encoded using temporal motion compensation techniques, the frame is called a Predictive, Inter, or "P" frame, wherein the decoding of the frame depends upon the successful decode of one or more previous frames. Examples of encoding algorithms include, but are not limited to, standard video compression technologies like MPEG-2, MPEG-4, H.263, VC-1, VP8, H.264, etc.

Modern video codecs achieve their incredible compression ratios largely through predictive encoding. However, the drawback is that packet loss (and the accompanying loss of spatial and/or motion data) within video frames upon which future frames are predicted causes a propagation of spatial errors or deformities, in time, until that spatial area is refreshed in a non-predictive manner via the next Intra frame in the sequence. Therefore, to limit error propagation, Intra frames are injected into the video stream at regular intervals (e.g. every 1 or 2 seconds). A sequence of one Intra frame followed by a succession of Predictive frames is called a Group of Pictures, or GOP. Assuming, for example, a GOP length of 30 frames and a simplistic frame slicing methodology (e.g., two to four packets per frame), the loss of a packet in frame four will cause subsequent deformities in the corresponding spatial areas of the remaining 26 frames, thereby, having a dramatic effect on the decoded video quality at a destination device until that spatial area is refreshed by the Intra frame at the start of the next GOP.

As noted above, some amount of packet loss is unavoidable due to the constrained nature of wireless networks. Furthermore, uncontrolled packet loss can lead to significantly degraded media quality.

Thus, there exists a need for a mechanism to control which video packets are discarded by a wireless network, thereby, providing unequal packet loss protection in such a way as to optimize decoded media quality.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
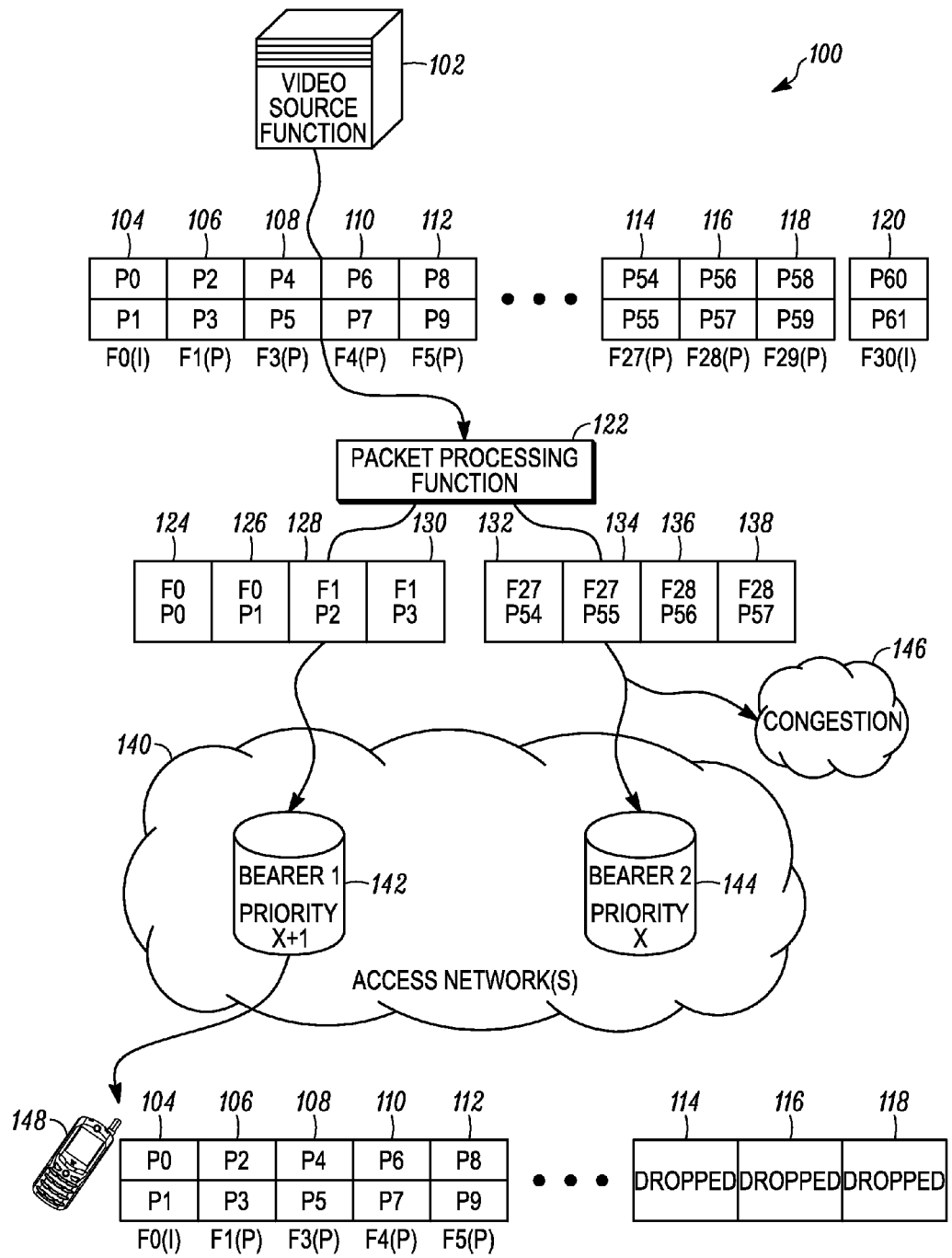
FIG. 1 is a diagram of a communication system that implements distribution of video packets over multiple bearers for providing unequal packet loss protection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method and apparatus distributes video packets over multiple bearers for providing unequal packet loss protection. The method includes a packet processing function receiving a plurality of packets that collectively includes video data from a group of pictures comprising a sequence of video frames, wherein the sequence includes one Intra frame at the beginning of the group of pictures followed by a plurality of Predictive frames. For each packet, the packet processing function: determines the corresponding frame that includes the video data; applies a bearer selection process to select one of multiple bearers for transporting the packet over an access network, wherein each bearer has a different quality of service level (used interchangeably herein with the term "priority level") which influences the probability of the transported packets being dropped, wherein the bearer selection process is based on the position of the frame within the sequence of frames; and provides, to an access network entity, an indication of the selected bearer.

Notably, the earlier the packet loss occurs in the GOP sequence, the more damage the loss inflicts on subsequent frames in the GOP and the more adversely decoded video quality is affected. Therefore, embodiments of the present disclosure provide for applying a bearer selection process that distributes video packets over multiple bearers (having unequal priority determined, for instance, by one or more Quality of Service (QoS) attributes or parameters) in such a way as to favor packet loss closer to the end of the GOP, which limits the extent of error propagation through the GOP and, thereby, enhances decoded video quality. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system that implements distribution of video packets over multiple bearers for providing unequal packet loss protection in accordance with some embodiments is shown and indicated generally at 100. In general, the system 100 includes a video sourcing function 102 having an application (not shown) that provides encoded source video comprising a sequence of frames (i.e., one or more GOPs) with each frame having one or more packets that are received into a packet processing function 122 that applies a bearer selection process or function in accordance with the present teachings in order to distribute the packets over multiple bearers (e.g., 142, 144) having unequal priority, for transport over one or more access networks 140 to a video receiving function 148.

A brief description of the elements of system 100 follows. The video sourcing function 102 is a logical entity 102 which provides a source of encoded video media for delivery over the access network(s) 140 to a receiving device, e.g., the video receiving function 148. "Video", "video sequence", or "video stream", as the terms are used herein interchangeably, mean one or more images comprising a plurality of pixels; wherein the plurality of pixels may be encoded using standard video compression techniques; wherein when there are a plurality of images, the video is, thereby, a sequence of still images with each image in the video sequence being termed a "frame". Moreover, the video sourcing function 102 may be included, for example, as an element of the infrastructure of a consumer, enterprise, or public safety network or as an element of a User Equipment (UE) device and includes one or more of: an application (e.g., Push-to-Video), stored video files or a video encoding function, etc., In this illustrative implementation, the video sequence comprises one or more GOPs, with (as mentioned above) each GOP beginning with an Intra frame followed by a succession of multiple Predictive frames. For example, FIG. 1 shows the video sourcing function 102 sourcing a first GOP comprising 30 frames that includes frames 0 (an Intra frame) through 29 (a portion of which are shown as Predictive frames 106 to 118), followed by a second GOP beginning with an Intra frame 120. For efficient transport, each video frame is further divided into smaller blocks of video data termed herein, in general, as video "packets" (but also referred to in the art as datagrams, and the like, depending on the particular protocols used). Moreover, the video sourcing function 102 uses various protocols such as Internet Protocol (e.g., IP v 4 or IP v 6, described in Internet Engineering Task Force (IETF) Requests for Comments (RFC) 791 and 2460, respectively), User Datagram Protocol (UDP) (e.g., as described in IETF RFC 768), Real-Time Protocol (RTP) (e.g., as described in IETF RFC 3550) to format the frames and packets in such a way as to enable routing of the packets to the intended destination and to enable reassembly and decoding of the frames at the destination device.

The packet processing function 122 is a logical entity that receives the video packets and applies a bearer selection process or algorithm (for example, as part of a method as described below by reference to FIG. 2) to determine the bearer on which to send each packet. In accordance with the teachings herein, the bearer selection process is based on the position of the frame (that contains the video data being transported within the packet) within the sequence of frames comprising a GOP. The packet processing function 122 may reside on any number of devices within network 100, separately or distributed over multiple devices.

In one network configuration, the video sourcing function 102 is connected to the infrastructure of the access network. On the downlink from the video sourcing function 102 to the video receiving function 148 (as illustrated in FIG. 1), the packet processing function 122 could be included in the video sourcing function 102, within an access network 140 entity (i.e., an entity included in one of the access networks 140, such as within a Policy and Charging Rules Function (PCRF) within a Long Term Evolution (LTE) network), as a stand alone device (as illustrated) or be distributed across multiple of such devices. In another network configuration, the video sourcing function 102 is connected to the wireless interface of the access. On the uplink from the video sourcing function 102 to the video receiving function 148, the packet processing function could similarly be implemented in the video sourcing function 102 or as a stand alone device or be distributed across multiple of such devices.

Access networks 140 comprise infrastructure devices used for managing the allocation and maintenance of bearer resources for the transport of media traffic such as video packets. Access networks 140 can include one or more access networks in any combination that provide the communication resources over which the media is transported. Examples of such access networks include, but are not limited to, one or more 3$^{rd}$ Generation Partnership Project (3GPP) networks such as LTE, one or more Radio Access Networks (RANs) (e.g., an E-UTRAN (Evolved UMTS Terrestrial Radio Access Network), any 2G RAN, such as, Global System for Mobile Communication (GSM), any 3G RAN, such as CDMA EVDO, or any 4G RAN, such as WiMAX), or one or more Wireless LAN (WLANs), such as 802.11, or any other suitable wireless or wired access network with provisions for associating a quality of service with a bearer for transporting media traffic.

Within broadband networks, such as LTE, one or more bearers (e.g., 142, 144) may be allocated for transporting of the packets over the network. As the term is used herein, a "bearer" is a virtual concept that represents an allocation of physical resources over the access networks for transporting identified media traffic (also referred to in LTE as Service Data Flows (SDFs)), such as the video packets, and is associated with a QoS level, which influences the probability of the transported packets being dropped.

In LTE, for example, a bearer can be a dedicated bearer or a default bearer. A default bearer is defined as a non-GBR (guaranteed bit rate) bearer that provides for "best effort" SDF transmission and is allocated to a UE for the duration of its attachment to the LTE network and need not be explicitly requested. A dedicated bearer is defined as any additional bearer that is established for the same UE and is specifically requested by (or on behalf of) a UE and can be either non-GBR or GBR, having a certain allocated or associated QoS or priority level as quantified by one or more QoS attributes, characteristics or parameters as packet delay, packet loss rate, guaranteed or minimum bit rate, pre-emption capability, etc. Moreover, in LTE, QoS or priority level is specified in terms of such parameters as Allocation and Retention Priority (ARP), QoS Class Identifier (QCI), Maximum Bit Rate (MBR), Guaranteed Bit Rate (GBR), etc, which influences the probability of the transported packets being dropped, as follows.

For example, where an application wants to provide unequal or different levels of packet loss protection to certain packets when said packets are transported over the access networks 140, the application requests and is granted or allocated bearers having different priority levels, e.g., bearers 142 and 144, respectively, having priority level X+1 and X (which has the lower priority of the two bearers), wherein X is the overall priority of the media flow with respect to other prioritized traffic. In theory, the application could request and reserve any number, N, of bearers, as allowed by the controlling protocol. In such a case, the N allocated bearers would have priority X+Y(N), where X is still the overall priority of the media flow with respect to other prioritized traffic, and where Y(N) (and the associated priority level of the bearer) is monotonically decreasing from [N−1] to 0, with X being the lowest priority level.

Accordingly, when the network is experiencing congestion 146, the network intentionally selects packets to drop based on the priority level assigned to the bearer over which the packets are transported. Thus, the higher the priority level of the bearer, the lower the probability of the network dropping or discarding packets being transported on the associated bearer, as compared to packets being transported on bearers having a lower priority level. Stated another way, the network will intentionally discard packets transported over bearers with lower priority levels before discarding packets being transported on bearers having higher priority levels, thereby, providing the unequal packet loss protection for the packets. This can be done on a packet by packet basis or the network may rescind a bearer altogether, such that the bearer is no longer available for transporting packets.

As mentioned above, priority level can be set by setting certain QoS parameters alone or in combination. For example, the unequal priority level of bearers 142, 144 could be enabled by assigning the bearers different ARP values, which influences the probability of the bearer being rescinded or pre-empted by the establishment of another bearer for traffic having a higher priority. The unequal priority level can also be enabled by assigning the bearers different QCI values, which control characteristics like packet delay, packet error loss rate, guaranteed or minimum bit rate, which in turn influence the probability of the transported packets being dropped. Also, the unequal priority level could be set by some combination of QCI value and ARP value. The exact means by which priority of a bearer, or the probability of the packets transported over said bearer being dropped, is expressed is dependent upon what quality of service parameters are supported by the network. By directing specific traffic to specific bearers, an application or intermediary function can control specifically which packets will be dropped when the network is no longer able to sustain a given bit rate.

The video receiving function 148 is a logical entity 148 which receives encoded video from a video sourcing function 102 by way of an access network 140. It may be included in any number of infrastructure and UE elements, the latter of which are also referred to in the art as subscribers or subscriber units, communication devices, access devices, access terminals, mobile stations, mobile subscriber units, mobile devices, user devices, and the like, and can be any type of communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users).

Figure 2:
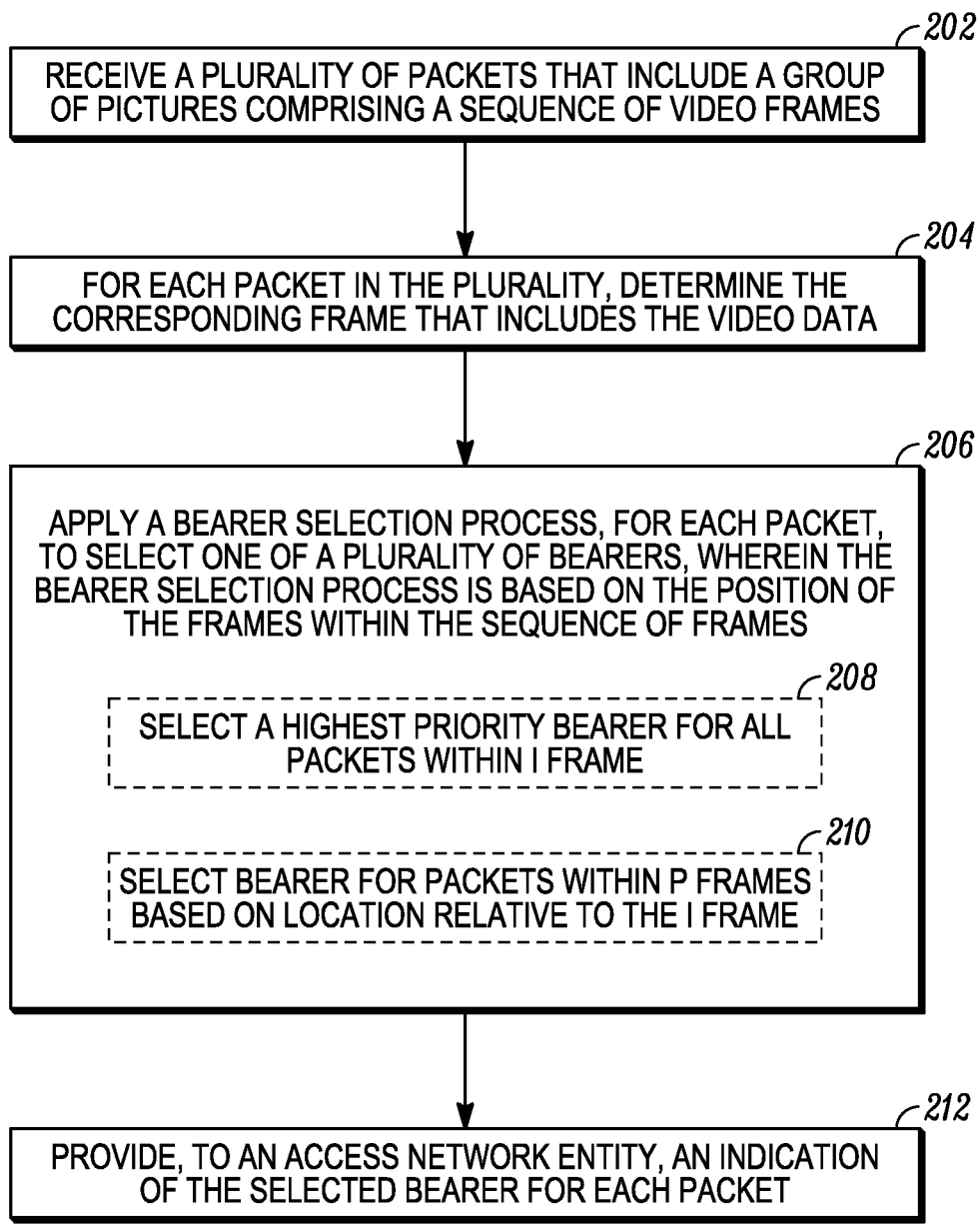
FIG. 2 is a flow diagram illustrating a method for distributing video packets over multiple bearers for providing unequal packet loss protection in accordance with some embodiments.

In general, the video sourcing function 102 (and its associated applications), packet processing function 122, access network 140 entities, and the video receiving function 148 (and its associated applications) are each implemented using (although not shown) a memory, one or more network interfaces, and a processing device that are operatively coupled, and which when programmed form the means for these system elements to implement their desired functionality, for example as illustrated by reference to the method shown in FIG. 2. The network interfaces are used for passing signaling, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless interfaces, such as EVDO, WCDMA, LTE, WiMax, WiFi, and the like, wherein some of the functionality of the processing, modulating, and transceiver elements may be performed by means of the processing device through programmed logic such as software applications or firmware stored on the memory device of the system element or through hardware.

The processing device utilized by these elements may be programmed with software or firmware logic or code for performing functionality described by reference to FIG. 2; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Turning now to FIG. 2, a flow diagram illustrating a method for distributing video packets over multiple bearers for providing unequal packet loss protection is shown and generally indicated at 200. Method 200 is performed in the packet processing function 122, and will be described in conjunction with the elements and packets shown in FIG. 1. Accordingly, at 202, the packet processing function 122 receives a plurality of packets from the video sourcing function 102, which collectively include video data from at least one group of pictures comprising a sequence of video frames, wherein the sequence includes one Intra frame at the beginning of the group of pictures followed by a plurality of Predictive frames.

For instance, the packet processing function receives a media stream from the video sourcing function 102, which comprises at least two GOPs. The first GOP transmitted, in time, starts with Intra frame F0 (104) and ends with Predictive Frame F29 (118), wherein only a portion of the frames in the GOP (e.g., frames F0 (104), F1 (106), F2 (108), F3 (110), F4 (112), F27 (114), F28 (116), and F29 (118)) are shown for the sake of clarity. The second GOP transmitted, in time, starts with Intra frame 120. The first GOP is broken into sixty sequential packets P0 to P59 for transmission over the access networks 140, wherein only a portion of the packets (e.g., P0, P1, P2, P3, P4, P5, P6, P7, P8, P9, P54, P55, P56, P57, P58, and P59) are shown for clarity.

In one illustrative implementation, the video sourcing function implements Internet Protocol and RTP to format and send the video packets. Accordingly, an IP header is added to each packet to facilitate routing in the network. Included in the IP header is information such as but is not limited to, information identifying a source IP address or IPv6 network prefix for the sending application, a destination IP address or IPv6 network prefix for the receiving application, a source port number, a destination port number, and a protocol ID of the protocol above IP (collectively referred to in the art as the "IP 5 tuple" since there are five parameters).

Moreover, a RTP header is added to each packet. Included in the RTP header is information such as, but not limited to, a timestamp value, indicating the relationship between packets and media frames and a sequence number value, indicating the relative ordering of packets in the media stream. In a further implementation, the video stream is encoded using the H.264 video compression standard. H.264 mandates a 1-byte Network Abstraction Layer, or NAL, header in the first byte of the RTP payload. Among other informational items, this NAL header indicates the frame type (e.g. Intra or Predictive).

Returning again to method 200, the packet processing function 122 determines (204), for each packet in the media stream, the corresponding frame that includes the video data for that packet and also, for each packet, applies (206) a bearer selection process to select one of a plurality of unequal priority level bearers for transmitting the packet, wherein the bearer selection process is based on the position of the frame within the sequence of frames of the GOP containing the frame, in accordance with various embodiments of the teachings herein.

To determine the corresponding frame and information about the frame, the packet processing function 122, for instance, can determine from the timestamp value in the RTP header the numbered frame to which the packet belongs and the relative location of that frame in the video sequence. Additionally, the packet processing function 122 can determine from the NAL header whether the frame is an Intra or Predictive frame.

In one illustrative bearer selection methodology, the packet processing function 122 selects (208) a highest priority level bearer for all of the packets having video data corresponding to the Intra frame, since the Intra frame serves to remove any spatial deformities which may have accumulated during the decoding process of frames from the previous GOP, and the proper decoding of this frame effects the decoding of all remaining frames in the GOP, and thereby affects the decoded video quality more than any of the remaining frames in the GOP. Selecting the highest priority bearer for transporting the packets in the Intra frame, thus, provides for the least relative probability that these packets will be dropped by the network when network bandwidth is constrained. For the remaining Predictive frames in the GOP, the packet processing function selects (210) the bearer for the packets having video data corresponding to the Predictive frames based on the location of the corresponding Predictive frame within the group of pictures relative to the Intra frame, wherein the priority level of the bearer selected decreases as the distance of the Predictive frame from the Intra frame increases. Thus, packets in Predictive frames closest to the Intra frame are assigned the same bearer as the packets in the Intra frame or are assigned to bearers having a higher priority level than the packets in Predictive frames that are closer to the end of the GOP.

An illustrative algorithm for bearer selection is as follows:
1. For a new media flow:
   a. If required to enable prioritized packet handling in the underlying network which provides connectivity to the intended recipient, establish/reserve N bearers in the underlying network, each with priority X+Y(N), where X is the overall priority of the media flow with respect to other prioritized traffic, and Y(N) is monotonically decreasing from [N−1] to 0.
2. Determine [GOP_LENGTH] by measuring the number of Predictive frames (e.g. unique timestamp values) between Intra frames (detectable by H.264 NAL type). This process can be performed once, and the resulting [GOP_LENGTH] can be assumed to remain constant for the remainder of the video sequence.
3. Identify which packets of a given media flow comprise a given media frame (e.g. by examining the timestamp value).
4. For N bearers, divide packets, by frame, into N groups having [GOP_LENGTH]/N frames within each group.
5. Direct packets belonging to a specific group to the bearer with priority X+Y(N), where X is dependent on the overall priority of the media flow with respect to other prioritized traffic, and Y(N) is monotonically decreasing from [N−1] to 0, with [N−1] assigned to packets closest to the start of the GOP, and 0 assigned to packets closet to the end of the GOP.

Looking back at the media stream transmitted by the video sourcing function 102, two bearers 142 and 144 were established for this media stream (N=2). The GOP length is 30 frames. Thus, in this case, the packets are divided into two groups having 15 frames each. Accordingly, bearer 142 (with the higher priority) is selected to transport packets from frames F0 to F14 from the first GOP, wherein illustratively shown are packets P0 (124) from frame F0, P1 (126) from frame F0, P2 (128) from frame F1, and P3 (130) from frame F1 are shown being transported using bearer 142. Moreover, bearer 144 (with the lower priority) is selected to transport packets from frames F15 to F29 from the first GOP, wherein illustratively shown are packets P54 (132) from frame F27, P55 (134) from frame F27, P56 (136) from frame F28, and P57 (138) from frame F28 are shown being transported using bearer 144. It should be noted that the above algorithm, which divides the frames comprising the GOP equally across available bearers, is merely exemplary, and instead could be embodied in such a way as to divide the frames comprising the GOP across available bearers in an unequal fashion. This may be necessary to fill available bearers with packets in such a way in such a way as to maximize their instantaneously available throughput.

To facilitate the packets being transported over the correct bearer, the packet processing function 122 provides (212) to an access network entity an indication of the selected bearer for each packet. This can be done in a number of ways. For example, in one illustrative implementation, the packet processing function 122 places some type of value or bits into one or more of the headers on the packet for the network entity to use in identifying the appropriate bearer. For example, the value is inserted into a Type of Service field of an IP version 4 header (e.g., a TOS value) or in a Flow Identifier field of an IP version 6 header, which allows a Packet Data Gateway in a LTE network to match the packet, via the inserted value, to a Service Data Flow Template or Traffic Flow Template (TFT) (corresponding to the selected bearer), which corresponds to the same value.

As stated earlier, various QoS parameters can be used to set the unequal or different priority levels for the allocated bearers. For instance, in a LTE environment, the same "latency" may be imposed on all allocated bearers to ensure that packets arrive on-time, and roughly in order. Moreover, not all bearer reservations need to be associated with a Guaranteed Bit Rate. One bearer may be GBR, while the other may be Non-GBR with a low-latency requirement. In addition, each bearer can be characterized by a different QCI value for providing the different priority levels.

Also, each bearer can be characterized by a different ARP value for providing the different priority levels. In a further implementation scenario, a highest priority bearer in the plurality of bearers is not preemptable (e.g., bearer 142), and at least one of the other lower priority bearers (e.g., bearer 144) is preemptable, based on the setting of the ARP values. This can be done by setting for the first (highest priority) bearer the "not pre-emptable" flag (to ensure that it remains reserved if possible), along with the "can pre-empt" flag (indicating it should preempt existence of other pre-emptable bearers, such as secondary, tertiary, and lower priority bearers of other streams). Other secondary, tertiary, and lower priority bearers have the "is pre-emptable" flag set (indicating that the first bearers of other streams may preempt this bearer if necessary).

Thus, when the network is forced to ultimately rescind a bearer reservation such as from congestion 146 in the network, it will start by dropping bearer 144 (and its associated packets), then the next highest priority bearer, and so on. When transporting video, it is generally better to altogether drop traffic intended for the rescinded bearer, rather than allowing it to flow onto the default bearer. This may be advantageous, as the best effort streaming media data will likely arrive too late for the media decoding process, needlessly consuming bandwidth which would be better occupied by other, non-time-sensitive, best effort applications.

As shown in FIG. 1, when the network 140 selects bearer 144 to rescind, the packets (e.g., within the frames 114, 116, 118, etc.) being transported using that bearer are discarded or dropped. However, the video receiving function 148 continues to receive the packets (e.g., within the frames 104, 106, 108, 110, 112, etc.) transported using bearer 142. According, using the disclosed teachings, packet loss is controlled and localized to frames later in the GOP; and due to the predictive nature of video compression, packets dropped later in the GOP sequence have a less detrimental effect on decoded spatial quality than packets dropped earlier in the sequence. In essence, we are trading spatial errors for temporal errors. More specifically, the loss of complete video frames in the latter part of the GOP will induce temporal jitter, and this is generally found to be favorable to propagated spatial deformity without the use of the disclosed embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, the method steps described herein and illustrated within the drawings do not necessarily require the order shown unless explicated stated herein. As such, the steps described may be taken out of sequence and come steps may be performed simultaneously and still fall within the scope of the teachings and the claims herein. In addition, benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for distribution of video packets over multiple bearers to provide unequal packet loss protection for these packets while being transported over a wireless network described herein. The non-processor circuits may include, but are not limited to, a radio receiver, a radio transmitter, signal drivers, clock circuits, power source circuits, and user input devices. As such, these functions may be interpreted as steps of a method to perform the distribution of video packets over multiple bearers to provide unequal packet loss protection for these packets while being transported over a wireless network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for distributing video packets over multiple bearers for providing unequal packet loss protection, the method comprising:
   a packet processing function performing:
   receiving a plurality of packets that collectively includes video data from a group of pictures comprising a sequence of video frames, wherein the sequence includes one Intra frame at the beginning of the group of pictures followed by a plurality of Predictive frames; and
   for each packet in the plurality,
      determining the corresponding frame that includes the video data,
      applying a bearer selection process to select one of a plurality bearers for transporting the packet over an access network, wherein each bearer has a different quality of service level which influences the probability of the transported packets being dropped, wherein the bearer selection process is based on the position of the frame within the sequence of frames, and
      providing, to an access network entity, an indication of the selected bearer,
   wherein applying the bearing selection process comprises:
   selecting a highest quality of service level bearer for all of the packets having video data corresponding to the Intra frame; and
   selecting the bearer for the packets having video data corresponding to the Predictive frames based on the location of the corresponding Predictive frame within the group of pictures relative to the Intra frame, wherein the quality of service level of the bearer selected decreases as the distance of the Predictive frame from the Intra frame increases.

2. The method of claim 1, wherein providing the indication comprises inserting a value within the packet, wherein the value is used by the access network entity to transport the packet using the selected bearer.

3. The method of claim 2, wherein the packet includes an Internet Protocol header, and the value is inserted into a Type of Service field of the Internet Protocol header.

4. The method of claim 2, wherein the packet includes an Internet Protocol header, and the value is inserted into a Flow Identifier field of the Internet Protocol header.

5. The method of claim 1, wherein each bearer is characterized by a different Allocation and Retention Priority (ARP) value for providing the different quality of service levels.

6. The method of claim 5, wherein a highest quality of service bearer in the plurality of bearers is not preemptable, and at least one of the other lower quality of service bearers is preemptable.

7. The method of claim 1, wherein each bearer is characterized by a different Quality of Service Class Identifier (QCI) value for providing the different quality of service levels.

8. The method of claim 1, wherein the bearer selection process is based on a length, [GOP_LENGTH] of the group of pictures.

9. The method of claim 8, wherein the bearer selection process comprises:
   for N bearers, dividing packets, by frame, into N groups; and
   directing packets belonging to a specific group to the bearer with quality of service level $X+Y(N)$, where X is dependent on the overall priority of the media sequence with respect to other prioritized traffic, and $Y(N)$ is monotonically decreasing from $[N-1]$ to 0, with $[N-1]$ assigned to packets closest to the start of the group of pictures, and 0 assigned to packets closet to the end of the group of pictures.

10. The method of claim 9, wherein the division of packets, by frame, into N groups results in each group having exactly [GOP_LENGTH]/N frames.

11. A packet processing function for distributing video packets over multiple bearers for providing unequal packet loss protection, the packet processing function comprising:
   an interface that receives a plurality of packets that collectively includes video data from a group of pictures comprising a sequence of video frames, wherein the sequence includes one Intra frame at the beginning of the group of pictures followed by a plurality of Predictive frames; and
   a processing device that:
   for each packet in the plurality,
      determining the corresponding frame that includes the video data,
      applying a bearer selection process to select one of a plurality of bearers for transporting the packet over an access network, wherein each bearer has a different quality of service level which influences the probability of the transported packets being dropped, wherein the bearer selection process is based on the position of the frame within the sequence of frames, and
      providing, to an access network entity, an indication of the selected bearer;

wherein applying the bearing selection process comprises:
selecting a highest quality of service level bearer for all of the packets having video data corresponding to the Intra frame; and
    selecting the bearer for the packets having video data corresponding to the Predictive frames based on the location of the corresponding Predictive frame within the group of pictures relative to the Intra frame, wherein the quality of service level of the bearer selected decreases as the distance of the Predictive frame from the Intra frame increases.

12. The packet processing function of claim 11, where the packet processing function resides in a User Equipment (UE) device.

13. The packet processing function of claim 11, where the packet processing function resides in an infrastructure device.

14. A computer-readable storage element having computer readable code stored thereon for programming a computer to perform a method for distributing video packets over multiple bearers for providing unequal packet loss protection, the method comprising:
    receiving a plurality of packets that collectively includes video data from a group of pictures comprising a sequence of video frames, wherein the sequence includes one Intra frame at the beginning of the group of pictures followed by a plurality of Predictive frames; and
    for each packet in the plurality,
        determining the corresponding frame that includes the video data,
        applying a bearer selection process to select one of a plurality of bearers for transporting the packet over an access network, wherein each bearer has a different quality of service level which influences the probability of the transported packets being dropped, wherein the bearer selection process is based on the position of the frame within the sequence of frames, and
        providing, to an access network entity, an indication of the selected bearer
wherein applying the bearing selection process comprises:
selecting a highest quality of service level bearer for all of the packets having video data corresponding to the Intra frame; and
    selecting the bearer for the packets having video data corresponding to the Predictive frames based on the location of the corresponding Predictive frame within the group of pictures relative to the Intra frame, wherein the quality of service level of the bearer selected decreases as the distance of the Predictive frame from the Intra frame increases.

* * * * *